United States Patent [19] [11] 3,909,791 van den Berg [45] Sept. 30, 1975

[54] SELECTIVELY SETTABLE FREQUENCY DIVIDER

[75] Inventor: Jan Wouter van den Berg, Boca Raton, Fla.

[73] Assignee: International Business Machines Corporation, Armonk, N.Y.

[22] Filed: June 21, 1974

[21] Appl. No.: 481,928

Related U.S. Application Data

[63] Continuation of Ser. No. 266,926, June 28, 1972.

[52] U.S. Cl. .......................... 340/172.5; 235/92 PE

[51] Int. Cl.$^2$ ...................... H03K 21/02; G06F 3/00

[58] Field of Search ............340/172.5; 235/92 PE, 235/92 DM, 92 FQ; 328/39, 42, 46, 51

[56] References Cited

UNITED STATES PATENTS

| | | | |
|---|---|---|---|
| 3,050,685 | 8/1962 | Stuart, Jr. | 235/92 PE |
| 3,278,727 | 10/1966 | Geis | 235/92 PE |
| 3,324,465 | 6/1967 | Brown | 340/172.5 |
| 3,538,442 | 11/1970 | Arkell et al. | 235/92 PE |
| 3,623,021 | 11/1971 | Haskin et al. | 340/172.5 |
| 3,651,414 | 3/1972 | Jamieson | 235/92 PE |
| 3,702,382 | 11/1972 | Breikss | 179/100.2 R |
| 3,742,195 | 6/1973 | Randle | 235/92 DM |
| 3,764,790 | 10/1973 | Long et al. | 235/92 PE |
| 3,789,195 | 1/1974 | Meier | 235/92 PE |
| 3,824,379 | 7/1974 | Tomisawa et al. | 235/92 PE |

*Primary Examiner*—Gareth D. Shaw
*Assistant Examiner*—Paul R. Woods
*Attorney, Agent, or Firm*—Delbert C. Thomas

[57] ABSTRACT

This description is of a complete small telecommunications processor which can be set to process lines of different speed characteristics. Each of the lines is scanned in turn, and each scan is counted for each line. The line sampling can be at any selected bit rate and can be the same for some lines or can be different for each line. The frequency divider comprises a storage having a two part storage for each line, a decrementer, a register, and a feedback path back to the storage.

During operation, a divisor is stored in a buffer part of storage. If the counter part of the same storage area is at zero, the buffer value is transferred through the decrementer and the register back into the counter storage. At each scan cycle thereafter, the count value is cycled and decremented until it reaches zero. This causes a pulse signal to be sent out and a reloading of the counter part with the value stored in the buffer. Continual repetition of such decrementing and reloading cycles will generate an output series of signals having a preselected frequency ratio with the input scanning frequency. If more than one line is being controlled by the frequency divider, the output signals will be interspersed in individual time slots of the output line.

4 Claims, 12 Drawing Figures

SELECTIVELY SETTABLE FREQUENCY DIVIDER

This is a continuation, of application Ser. No. 266,926 filed June 28, 1972.

OBJECTS OF THE INVENTION

Multiplexing processors for telecommunication lines of the type described are generally well-known and some are capable of sampling each connected line at any one of a group of selected frequency rates. These generate sampling pulses for the different lines, but are usually quite costly due to the requirements of separate precision oscillator for each selected frequency. One example of such a multiplexer is shown in the Assignee's U.S. Pat. No. 3,337,855, issued Aug. 22, 1967 to W. H. Richard et al. The disclosed and patented features are embodied in the commercial IBM 2702 Transmission Control Unit marketed by the Assignee of this application.

Another known method for frequency division is set out in U.S. Pat. No. 2,892,933 issued June 30, 1959 to R. F. Shaw. The relevant part of the patent shows a recirculating path for a count with an incrementer in the path. The incrementer can be controlled to add a unit to the circulating count. A conincidence gate is used to give an output signal and to reset the counter when a predetermined count is reached. The circuit is not readily adaptable to different divisor rates and a change requires a physical modification of the coincidence gate.

A later development of this method is to provide a comparison register which can be loaded with a selected divisor from a storage location. When a counter which keeps a count of the number of cycles has a value equal to that in the comparison register, the counter is reset to start a new counting cycle and an output signal is given.

It is also known to measure a time interval by setting a counter to a starting value and repeatedly decrementing the counter by a regularly occurring clock signal. An output signal is given when the counter is decremented to a zero value.

It is then an object of this invention to provide a frequency dividing system which can be set to divide an input signal by an integral divisor up to a limit and which can be readily adjusted to a new divisor without a need for physical changes.

It is also an object to provide a clocking circuit which can be set to provide repetitive sampling pulses at any selected repetition rate.

Another object is to provide a unitary sampling pulse generator which has a single set of generator hardware used to successively produce such pulses for a plurality of communication lines.

Still other objects, features and advantages of the invention will be apparent from the following more particular description of a preferred embodiment of the invention, as illustrated in the accompanying drawings.

DESCRIPTION OF THE PREFERRED EMBODIMENT

Figure 1:
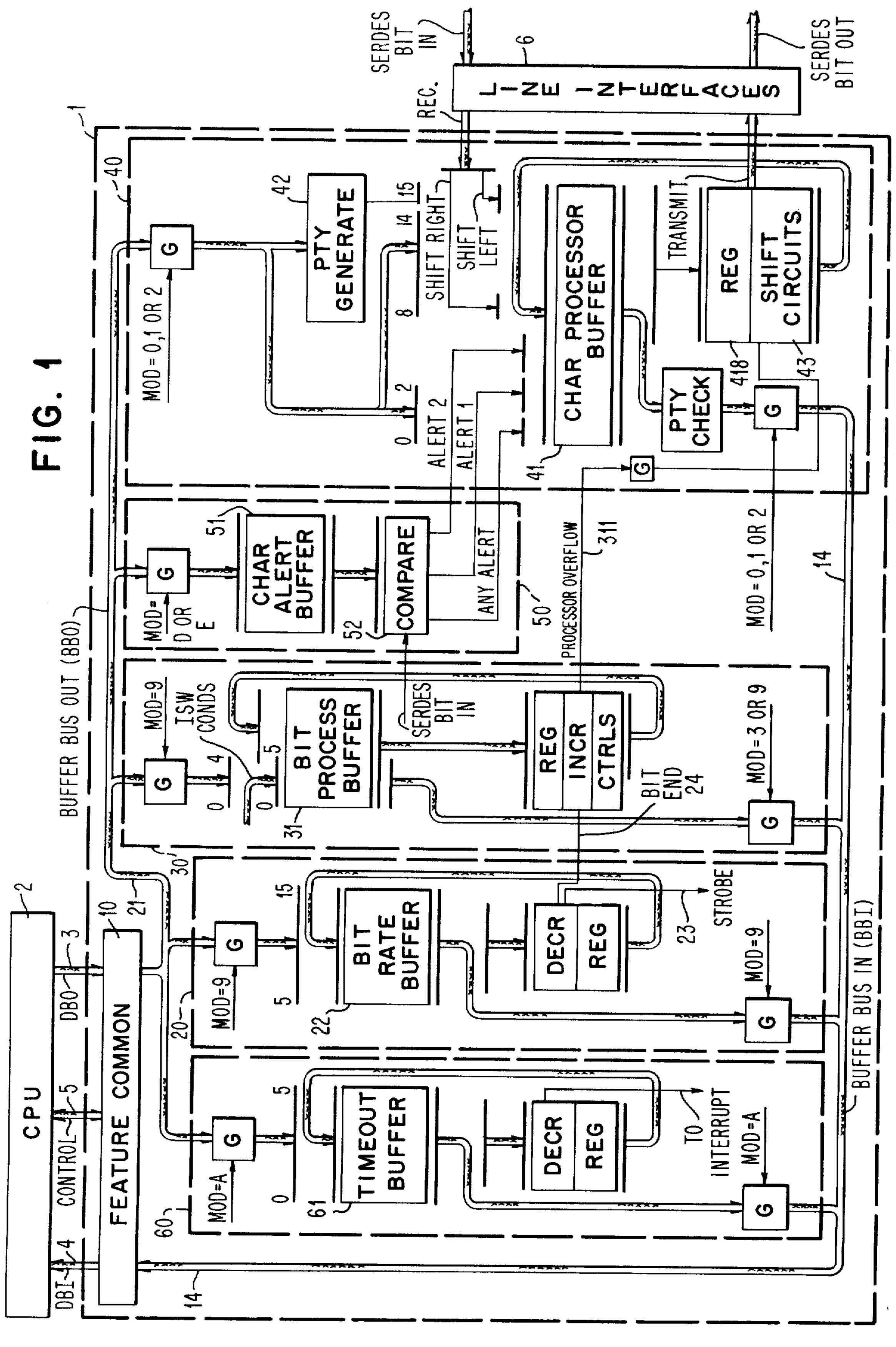
FIG. 1 is a diagrammatic view of a complete system for processing data on a plurality of communication lines.

The frequency dividing circuit of the invention is described in conjunction with the description of a small teleprocessing multiplexing system. As indicated in FIG. 1, a multiplexor 1 is connected to a central processing unit (CPU)2 by way of a data bus out (DBO)3 and a data bus in (DBI)4 together with other control circuits 5 needed for control and status information, CPU 2 may be a conventional general purpose data processing system having the usual channel controls and may typically be a System 7 processor such as those produced and sold by the assignee of this invention. Numerous publications describing the functions performed by such System 7 and its hardware details are available from the assignee, International Business Machines, Inc. One such available publication is "The Theory-Maintenance Manual" for the System 7, form No. SY34-0027, which can be obtained from local offices. At the other side, the multiplexor 1 hereafter indicated as MPX 1 is connected through line interfaces 6 to a plurality of communication lines not shown in FIG. 1. Each of these communication lines connects to circuits of multiplexor 1, sections of which operate only when selected by a line-associated address. These sections may be selected to interface, one address at a time, with the CPU 2. Each line will be serviced in sequence by the MPX 1. The MPX will interface with the CPU 2 only when it needs to be serviced by the CPU 7. When constants and control bits are to be set, the service will be initiated by the CPU 2. If the MPX 1 needs new data from the CPU 2 or needs to transfer data to the CPU, it will initiate the service through interrupt request signals. The MPX 1 is composed of seven basic functional elements. These are:

- Feature Common
- Scanner
- Bit Rate Processor
- Bit Processor
- Character Processor
- Character Alert
- Timeout Processor Two of these elements, the feature common and the scanner, are common to all of the communication lines. The other elements contain storage buffers which are addressed as the lines are selected. This allows the other circuits in the elements to be used with each line as it is selected. The buffers may interface with the CPU 2 via the DBO 3 and DBI 4 when the line is serviced. The nature of the data transferred will be determined by the CPU command and its modifiers. Only the general data flow of the MPX 1 is shown in FIG. 1 and will be broadly set out at this point. The specific details of many of the logic blocks functionally described herein are not of significance in the overall function of the structure of the invention and many suitable functional equivalents are available in the art. Representative circuits for the functions are described in the publications: (1) "Arithmetic Operations in Digital Computers," authored by R. K. Richards and published by D. Van Nostrand Co., Inc. with a 1955 copyright, Library of Congress Catalog Card No. 55-6234; (2) "Information," a Scientific American Book by W. H. Freeman and Co., copyright 1966 with a Library of Congress Catalog Card No. 66-29386; and (3) "Manual of Logic Circuits by Gerald A. Maley, published by Prentice-Hall, Inc., with a 1970 copyright date and a Library of Congress Catalog Card No. 74-113716.

Feature Common

The feature common 10 of the MPX 1 is composed of a basic feature common and an extension. The basic feature common is a conventional parts of the System 7 adapter units in commercial use. The basic feature common comprises signal conversion circuits and is used for many types of devices to connect them to a CPU channel. The feature common extension adapts some of the device interface signals of the feature common to the specific needs of the MPX 1. Other interface signals are used in the basic feature common and there are other signals in the basic feature common which are connected directly to the MPX. The functions of the feature common are the same as those in the commercial System/7 I/O modules. Both the feature common and the feature common extension are names for a convenient grouping of circuits which are common to the attachments made to the System 7 CPU 2. Both groups of circuits have been in public use in systems using the System 7 CPU prior to the June 28, 1972 filing date of the original patent application Ser. No. 266,926 on this invention. One such public use was in a machine identified as the IBM System 7 Teleprocessing Multiplexer with an identification type number of 5098-NO1.

Scanner

The scanner (not shown in FIG. 1) is a conventional type of binary counter such as described at pages 116 to 120 or pages 200–201 of the Maley publication above or some of the commercial counter modules available in a prepackaged unit. It is oscillator driven at a fixed rate and generates a binary coded output on a four line output bus. The four line output bus selects each of the communications interfaces in sequence and reads the device status from the interface and control storage. The scanner function is automatic and begins to operate as soon as power is applied. However, the interfaces 6 are idle until the proper control bits are set into a control storage.

Buffers

Figure 2:
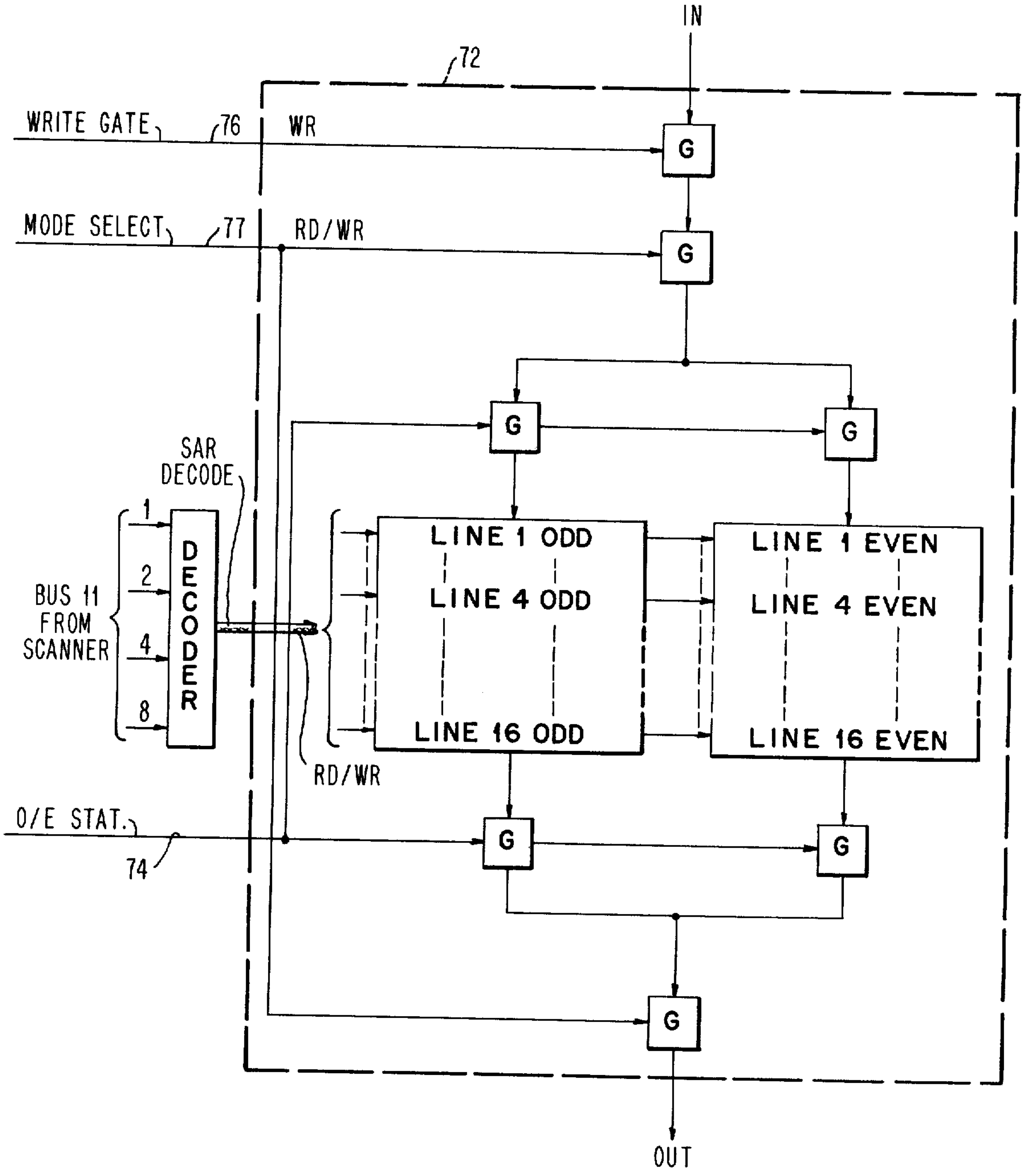
FIG. 2 is a detailed diagram of the type of data storage module used in the system.

The buffers used in MPX 1 are not one of the basic elements above but are components that are used in several of the basic elements. There is a buffer in the bit rate processor, bit processor, character processor, character alert, and timeout processor. Each buffer is composed of a group of array modules. Each individual 72 (FIG. 2) is composed of 32 storage positions with three data storage latches in each storage position. The storage latches may be circuits such as the flip flop auto reset type on pages 80–87 or 181–186 of the Maley publication above. The input gates controlled by the O/E Stat line in FIG. 2 are included in these described circuits. The positions are further divided into 16 odd and 16 even positions. One four-bit address on bus 11 from the scanner will address an odd and an even position at the same time. The other factor to determine which group of three data bits are available to the external circuitry at a given time is the condition of a line 74 called O/E STAT. The bus 11 from the scanner addresses each of the storage positions sequentially. Each buffer is composed of several array modules and the scanner is conditioning all other modules at the same time. This causes two variable length blocks of data to be addressed at once with the state of the O/E line 74 making a final selection of the desired blocks. The two blocks contain different types of data used in the operation of the element. One block (buffer odd) is generally used to store a constant or parameter. The other block (buffer even) is generally used to store variables or data that will change during the operation of the functional element. The condition of the odd/even status line 74 is established by the needs of the device and determines which of the two blocks is to be used at a given time. The condition of write gate line 76 and mode select line 77 (RD/WR) will determine whether the selected block is to be written into or read out of the buffer. Each element uses its buffer in a unique manner. Some buffers have six modules to obtain a capacity of one word (16 bits) for each of the even and odd positions available to one address. Other buffers HDB's use as few as two modules for a capacity of six bits. The size of the buffer depends on the needs of its element.

Bit Rate Processor 20

The bit rate processor develops the strobe point time and bit end times for data bits of all lines. When the MPX 1 is providing the clock for a line, a constant value (binary number) is supplied by the program (Bits 5-15 of the write device constants word) stored in CPU 2 via DBO 3, feature common 10 and buffer bus out (BBO)21 to the bit rate buffer 22 (buffer odd) associated with the line. This constant value is loaded into the even side of buffer 22 which even side then serves as a storage buffer /and is decremented by one each time the scanner selects the line. When the value in the counter part of buffer 22 goes to zero, a strobe pulse is generated on strobe line 23. The counter is reloaded from the even side or buffer part of buffer 22 and begins counting down again. The second time the counter goes to zero, a bit end pulse is generated on bit end line 24. The counter part of buffer 22 is shown as being 11 bits wide which will provide a counting capacity of 0 to 2047. Zero is reserved to designate data set clocking. All other counts are valid but the low end should not be used because of the large marking distortion that will result due to cycle steal and other interrupts. When a device is operating in data set clocking mode, the bit rate processor 20 detects the changes in the clock signal from the data set and converts them to strobe and bit end pulses on lines 23 and 24.

Bit Processor 30

The bit processor 30 creates the sequence of controls necessary to transmit or receive a series of bits as a character. It also determines the beginning and end of a character. Bits 3 and 4 of the constant for each device word define the character length for that device and are loaded into the associated line of the odd side bit processor's buffer 31 along with bits 0 and 2. At the beginning of processing of a character, the length code is transferred into the even side of the bit counter/buffer 31). At each bit end pulse on line 24 from the bit rate processor 20, the count is incremented. When the counter overflows, the end of a character is signalled by a pulse on line 311. In synchronous mode (indicated by setting of bit 0 in buffer odd for the communications line), the bit processor immediately starts the next character. In asynchronous mode, it will generate the proper stop bit timings. The bit processor also detects some errors and controls interrupt status generation.

Character Processor 40

The character processor 40 buffers the characters in and out of MPX 1, and performs the serialize and deserialize operation.

Transmit Mode

Figure 6:
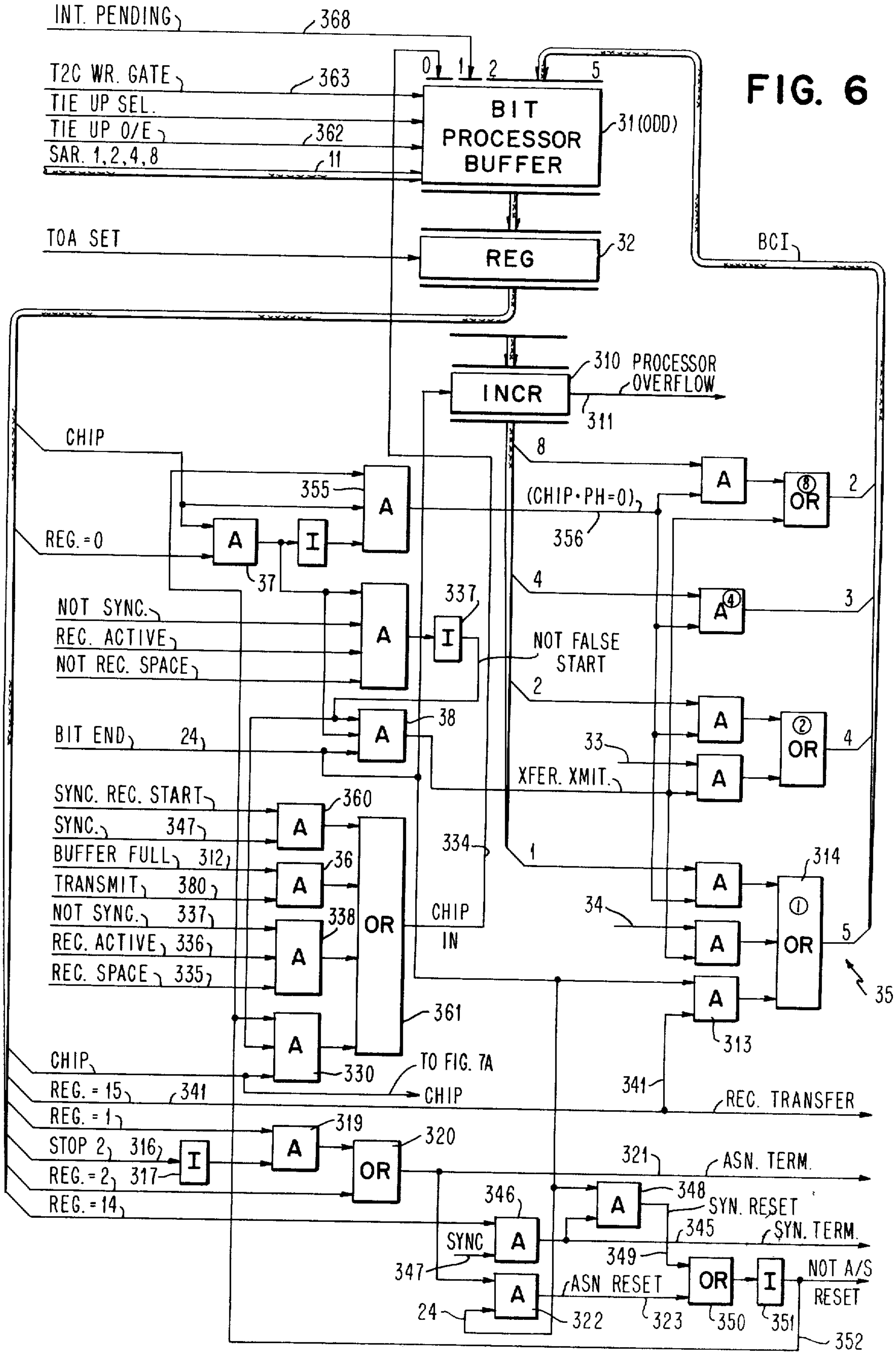

When a character is transferred from the CPU 2 to the character processor buffer (odd) 41 for the line being scanned, the buffer full indicator is (bit position 0 in buffer 31 odd) is set on by the buffer full signal on line 312, FIG. 6 through and 36 and or 361 to energize the CHIP IN line 334. Proper parity will be generated by parity generator 42 which can be the conventional tree of Exclusive OR circuits of the type described on pages 47, 48, or 161–163 of the above "Manual of Logic Circuits" and will be inserted in the low-order buffer position of the buffer storage as directed by the write TX data signal. To start a transmit operation in asynchronous mode on a line being scanned, the character processor waits for detection of an on buffer full bit for the scanned line. When buffer full bit is detected, a start bit is generated for transmission over the line. At the end of transmission of the start bit, the character bits in the line buffer (odd) 41 are transferred to the serializer-deserializer (serdes) part of the lines buffer (even) and are shifted in shifter 43. The high-order bit is sent to the line. The buffer full bit is reset and a buffer service interrupt signal is generated. At each succeeding bit end time, the serdes is again shifted and another high-order bit is sent to the line. When the bit processor 30 signals that the last bit of a character has been transmitted, the character processor 40 begins looking for a buffer full signal again. Normally, the buffer would have been reloaded by this time; but if not, the character processor continues the search until the character is loaded by the CPU 2.

In synchronous mode, the operation is similar, except that when the character processor 40 enters a character search routine, it must find the buffer full signal turned on. If buffer full is not on, a data overrun interrupt will be generated and sent back to the CPU 2 via feature common 10.

Receive Mode

In receive mode, the character processor waits for the bit processor 30 to detect the start of receipt of a character. Then the character is built in the serdes part of character processor buffer (even) 41, one bit at a time, until the character is completely received. The character is then transferred to the buffer side of the processor buffer (odd) 41 of the lines storage area. A buffer service interrupt signal is generated and transmitted to CPU 2 for action. The buffer side must be cleared before the next character is completely assembled in serdes.

Character Alert 50

Figures 9, 9A:
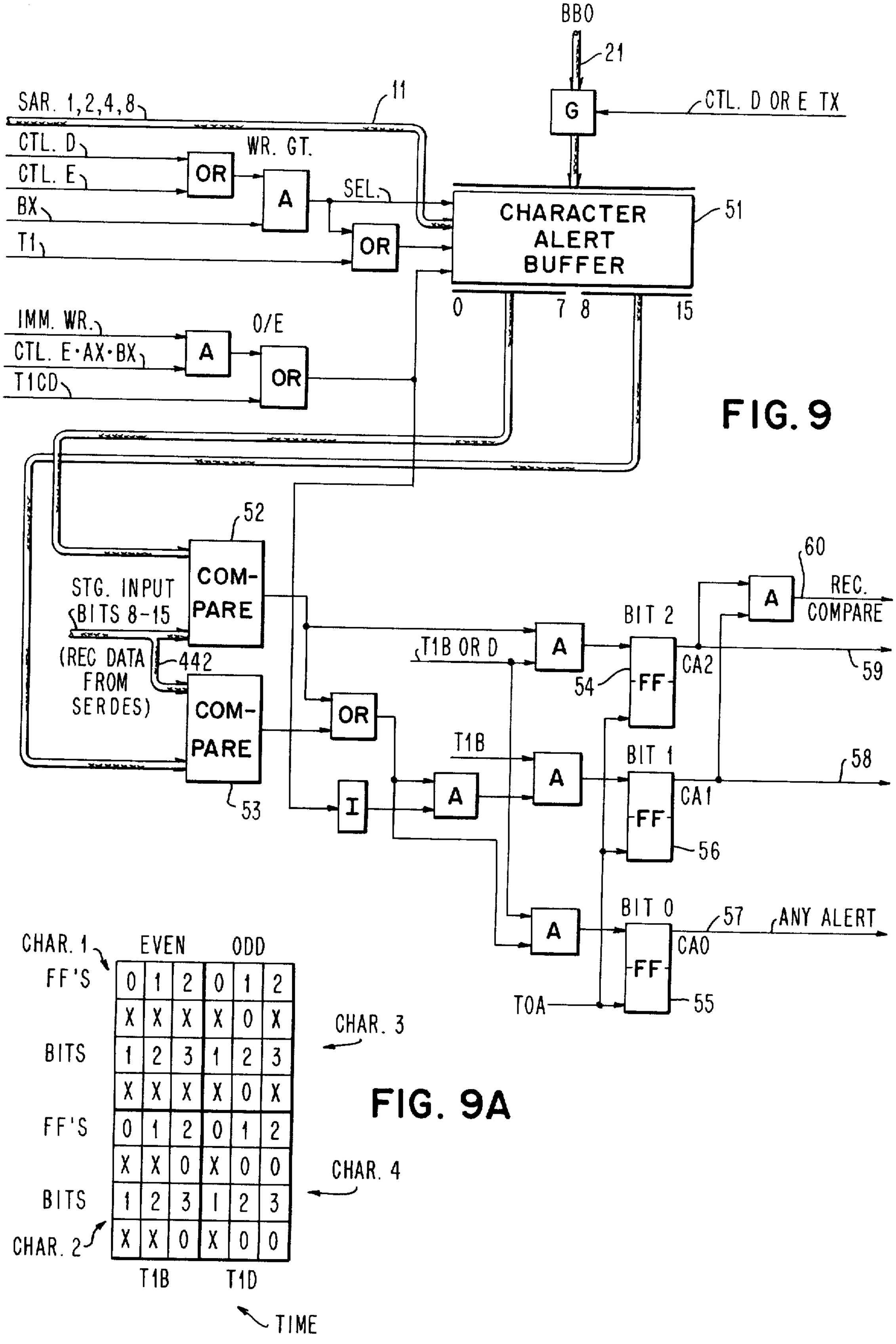

Two write character alert commands load the character alert buffer 51 with four alert patterns for each communication line. A modifier of hexadecimal D (binary 1101) from ands 113 for the modifier register 18, FIG. 3, line. A modifier 0 (1101) cause the even buffer part to load with eight-bit patterns 1 and 2. A modifier E (1110) causes the odd buffer to load with patterns 3 and 4. The four character alert patterns are compared in a compare circuit 52 with each received character. If one of the patterns is detected, an alert code is developed and a coded signal generated by flip flops 54, 55, and 56 in accordance with the pattern shown in FIG. 9A, is loaded into the corresponding address of the character buffer (odd) 41 to be sent with the character to the CPU 2 four bit counter which drives a three bit.

In synchronous receive, the character alert 50 will automatically begin to search for a sync character with every strobe of every line. When the synch pattern has been detected as receive from a line, a signal is sent to the bit processor 30 to start processing that line. Once sync is established, a line is not checked for sync again. The program must take the required logical checks for sync during the message.

Timeout Processor 60

The timeout processor 60 of MPX 1 provides a timer for each device for which a communication line is attached. A time out constant supplied by the program for the line is placed in the lines section of the timeout buffer (odd) 61. The timeout counter (even) side of the buffer address is loaded by transferring the contents of its address buffer section into it and is decremented at half-second intervals under control of its oscillator. When bit 0 (continue timer) is off, the timer functions as a no-activity timer for the line. It will be reloaded each time it is addressed if a character is being processed. The timer will cause a CPU 2 interrupt only if the time period specified by the buffer content is allowed to elapse between characters. The timer is not disabled by the interrupt. It will continue to signal interrupts, thus allowing the program to establish, by counting, time periods of multiples of the base timeout constant. When bit 0 is on, the timer will send interrupts at the time period specified regardless of the activity on the line.

Circuit Descriptions of Functional Elements

The scanner circuits are substantially conventional and are not more particularly described. In general, an oscillator provides a basic clock signal. This basic clock operates a counter to generate three clock times of T0, T1 and T2 which each of comprises a scanner step with each step subdivided into A, B, C and D phases. The four bit scanner steps are counted in a scanner address ring (SAR) to provide separate line addresses for scanning the communications line. If an interrupt cycle is required, the scanner is held at its setting, and the normal clock pulses are diverted and relabled with an X subscript to perform a cycle step operation to process the interrupt.

Figure 3:
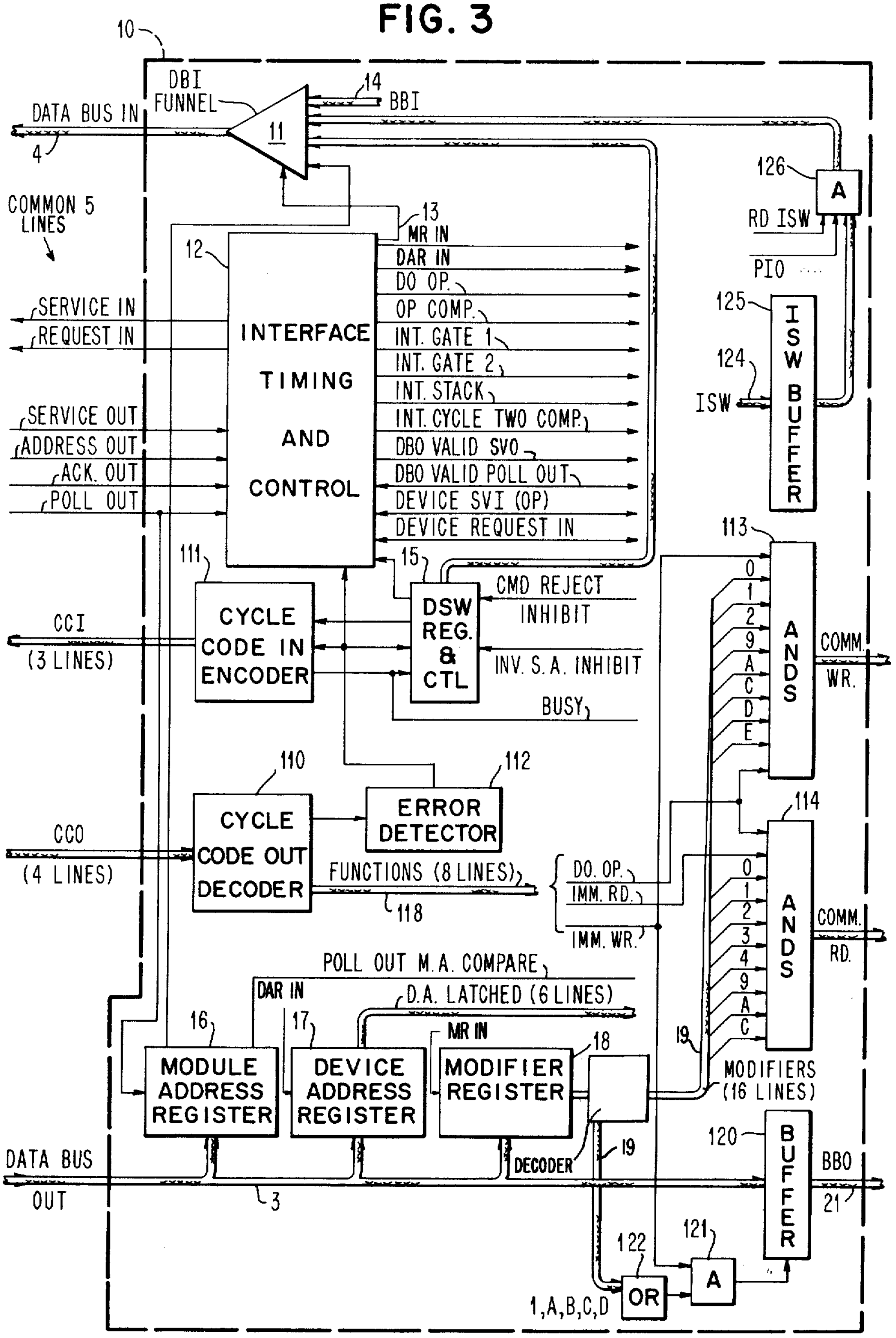
FIG. 3 is a detailed schematic of the interface unit of the system of FIG. 1.

Feature Common 10, FIG. 3

The feature common 10 is a conventional part of the publicly used channel adapter for the above CPU 2 and connects via the DBO 3, the DBI 4 and the common lines 5 to CPU 2. The functions performed by the common lines 5 are the usual ones for the cited System 7 channel operations and in as much as they form no part of the present invention, will not be further specifically set out.

Within the feature common 10, a DBI funnel 11 is controllable by an interface timing and control circuit 12 (organized as set out in pages 337 to 342 of the above reference "Arithmetic Operations in Digital Computers" and forming a part of the multiplexer type 5098-NO1 above referred to) via a bus 13 to pass to the DBI 4, the data from the buffer bus in (BBI)14, data from the device status word (DSW) register and control 15 and the address from the module address register (MAR)16. A device address register 17 is loaded along with MAR 16 from the DBO 3 to store a full device address needed for selection of a device. A modifier register 18 and decoder also accepts command data from the DBO 3 and decodes it to a one out of 16 line signal on modifier lines 19. These registers are similar to the buffers described above in that they are a group of settable flip flops which may be set by the DBO 3 and retain their settings until a reset or a new value is entered therein. The decoders noted are each comprised of a group of the circuits, each having a combination of inputs and operating to energize one of the output lines for each combination of input signals, or may be as shown on pages 57–59 of the "Manual of Logic Circuits" supra. The cycle code in encoder 111 is, in effect, the same as a decoder, but since it reduces a number of input signals to a lesser number of output lines, it will be operated as a group of or circuits to activate the output lines in combinations dependent upon the active input line. The cycle code decoder 110, the cycle code in encoder 111 and the error detector 112 (a group of and circuits, each and to be activated by one non-permissible combination of energizations of the CCO lines and having a common or'ed output to indicate an error when one of its ands is activated) are standard parts of the feature common interface units of the IBM System/7 and it will be noted that all of these units are connected to various ones of the common control leads 5 and to the devices attached to the feature common 10.

The modifier lines 19 are supplied to a write group of and circuits 113 and to a read group of and circuits 114. When the cycle code out decoder 110 decodes a command for a communication line, it puts signals on its output lines 118 to select an and circuit of the groups 113 or 114 to pass a modifier signal to the line circuits as will be later set out. Data on the DBO 3 will be entered into a buffer 120 and will be placed on the BBO 21 under control of a signal from an and circuit 121 receiving the immediate write command from bus 118 and any one of the modifiers 1, A, B, C, or D from bus 19 through an or 122. An interrupt status word bus 124 carries data indicating the conditions causing an interrupt request and its data will be stored in buffer 125. When the data is needed by CPU 2, a read ISW command and a PIO timing signal from the CPU 2 will activate gate 126 to pass the ISW through the DBI funnel 11 to DBI 4.

Bit Rate Processor 20

Figure 4:
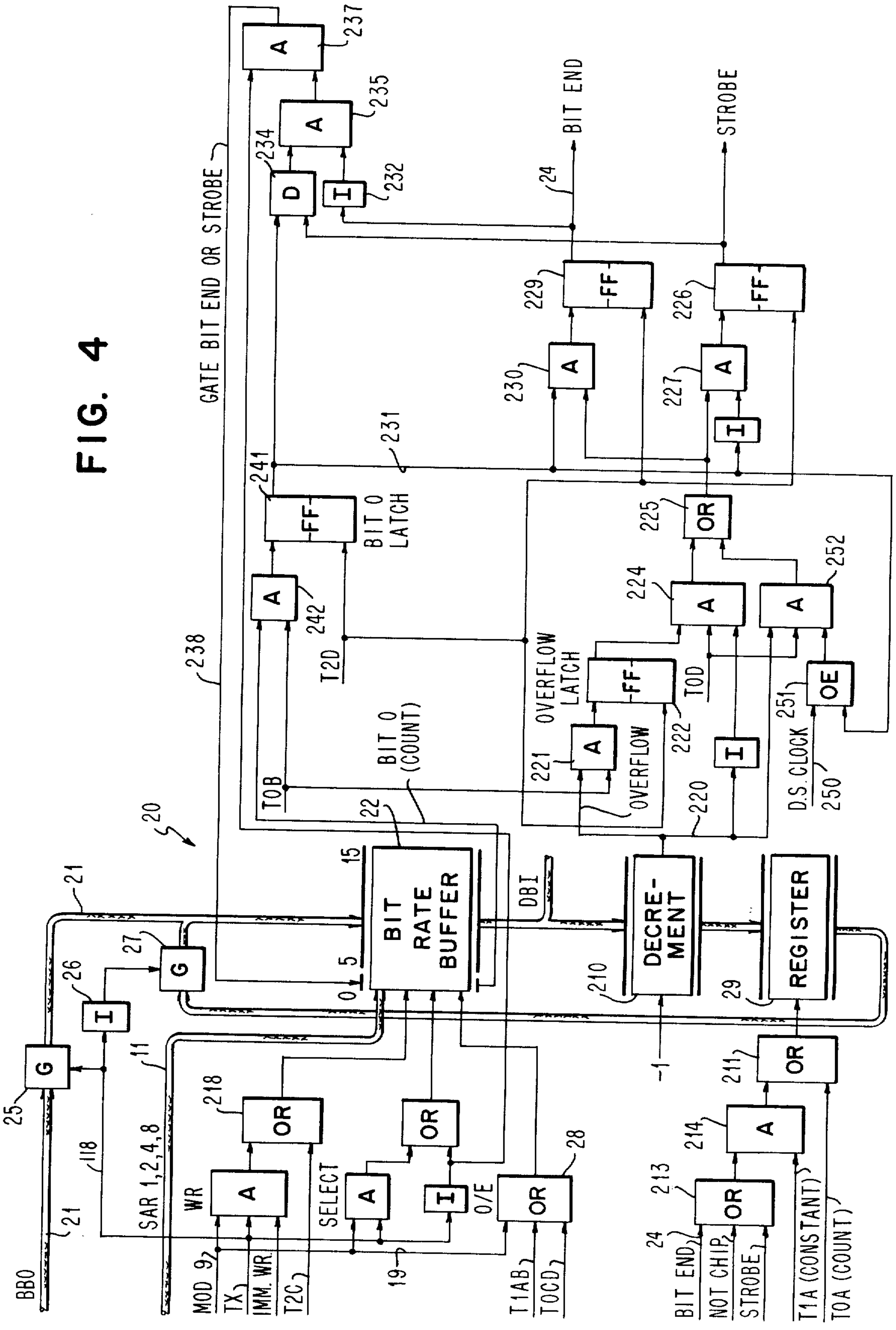
FIG. 4 is a diagram of the bit rate processor containing the feature of novelty of this application.

The bit rate processor 20, as more fully set out in FIG. 4, includes the feature which this application claims as novel. In function, as each line of storage is scanned in buffer 22, the count value in the counter (even) portion of the buffer is read out to the decrementer 210 where the count value is decremented by a unit. A decrementor such as 210 can be a full subtractor circuit of blocks such as set out on page 67 of the "Manual of Logic Circuits" where one of the inputs is a value of 000---01. Simpler circuits which invert all low order "zeros" to "ones" and also invert the lowest order "one" to a "zero" are well known and can also be used here. The new count is returned to the count portion of the buffer for storage until it is addressed during the next scan. When the count in the counter is zero, it will cause the output of decrementer 210 to overflow, i.e. go negative, and this causes the emission of a bit control signal, alternatively a bit end signal for transmissions or a strobe signal for the middle of a bit during data reception. On the same cycle, the overflow condition of decrementer 210 prevents reentry of the decremented count into the counter part of the buffer 22 and instead passes the constant value from the odd half of buffer 22 through decrementer 210 and register 29 for entry into the count side (even) of buffer 22 as the next count value to be counted down. The cycle of counting down to give a signal and reloading the counter with a preselected constant can be used to select any bit rate for processing the data to be handled.

Each device attached to MPX 1 is controlled by the rate processor unless it is a self-clocking receiving type which generates its own clock. When any device is selected by the scanner, all elements of the bit rate processor are dedicated to the device. Since the scanner address is sent to all elements, all signals between elements relate to the device being processed at that time. The strobe and bit signals will occur at random intervals and it is possible for several to be produced in the course of any one scan or conversely, it is possible for a number of consecutive scan cycles to be preformed without a strobe or bit signal occurring.

Transmit-Internal Clocking

In this description of the operation of the bit rate processor 20, the operation for only one device, i.e., the device having SAR address of 1, will be set out. It is to be understood that the corresponding functions for the other devices with different SAR addresses will be interspersed with the described steps.

The first command issued to a device (which is selected in the usual System/7 operations of sending successive Module Address and Device Address signals on DBO 3 along with the control signals on the Common Lines 5. These signals will gate the module and device addresses into registers 16 and 17 to select the device (buffer line in buffers 22, 31, 41, and 51)) after a system reset is "write device constants" (Modifier 9 on bus 19, FIG. 3). This command initiates an MPX 1 cycle steal during which bits 5-15 (the bit rate constant) are gated from BBO 21 to the bit rate processor buffer 22 odd side through a gate 25 under control of the TX cycle steal signal on line 118. The inverse of the TX signal from an inverter 26 acts on a gate 27 to prevent any recirculation of the buffer contents at this time. The modifier 9 signal on bus 19 from the feature common 10 acting through or circuit 28 will cause selection of the odd side of the storage line in buffer 22.

After the buffer 22 is loaded with constants in a cycle steal, at each scan address (here SAR 1), the even side of the devices line of the buffer 22 (counter) is gated into a register 29 through a decrementer 210 at time TOA by a set signal through OR circuit 211 to the set input of register 29. At time TIA, there is no character in process (CHIP) for the associated device so that NOT CHIP line 212 is up to provide an output of or 213 which gates the TIA clock signal through and 214 and or 211 to reset the register to the constant value minus one which is on the input leads from the decrementer 210 at this time. At time T2C, the clock signal passes through or 218 to set the bit rate buffer 22, even side (counter) to register count. This sequence will repeat so long as NOT CHIP line 212 remains up and the counter section will be reset each time to the constant value minus one.

When the bit processor 30 starts processing a character, the NOT CHIP signal is removed and register 29 is no longer reset to the constant value minus one bit is left at the counter minus one value. Due to the recycling, this counter value will be decremented by one on each scan cycle until the decrementer 210 underflows (has an output of less than zero). With such underflow, the bit rate processor operation is as follows: At times

| | |
|---|---|
| TOA | Decrementer 210 overflows with a signal on line 220, decremented count set into register 29; |
| TOB | Overflow on line 220 gated through and 221 to set overflow latch 222; |
| TOC | Odd/even or 28 signals to set the buffer 22 to the odd side, cutting off the even side (count) data and terminating the overflow signal from decrementer 210; |
| TOD | The overflow latch 222 output is gated through and 224 and or 225 to set the strobe latch 226 (or bit end latch 229 through and 230) depending on whether there is not or is a signal present on a line 231 to be later described; |
| T1A | The set strobe or bit end latch output on line 24 into or 213 sets register 29 with the constant minus one; |
| T2C | The constant minus one is transferred from register 29 into the even (counter) side of the storage line of buffer 22. The setting of the bit 0 position of the storage line of buffer 22 will be changed. If the strobe latch had been set, the bit end output on line 24 signal is down and its inverse from inverter 232 combines with the strobe signal on line 233 delayed by delay 234, in and 235. Since the cycle is not a cycle steal, the output of and 235 gates through and 237 to line 238 to set bit 0 on when buffer 22 is set. If the bit end latch is set, the inverted input to and 235 prevents the line 238 from going on and causes a reset of the bit 0 position; and |
| T2D | The overflow latch 222, strobe latch 226 and bit end latch 229 are reset. |

The bit 0 position of bit rate buffer 22 will be continuously regenerated by the readout on line 239 setting a BO latch 241 by being gated through an and 242 at TOB time. If the bit is on indicating that the last operation was a strobe, the output of latch 241 will pass delay 234 in the same manner as the strobe pulse to regenerate pulse to regenerate the strobe setting. Latch 241 will be reset at the T2D time. If the bit is zero, there will be not input to delay 241, thereby holding line 238 down and regenerating the zero setting.

With each signal from overflow latch 222, the output of bit 0 latch 241 will direct the bit end latch 229 and the strobe latch 226 to become alternately set and as above noted, this setting will regenerate in the bit O position.

Receive-Internal Clocking

During a data receive operation, the bit rate processor 20 operates in the same manner to generate the alternate strobe and bit end signals. The only distinction is that the CHIP signal is set on when the bit processor detects a start signal or sync signal on the communications line.

Data Set Clocking

When MPX 1 is operating with one or more of the communications lines being clocked by a conventional data set, the bit rate processor will detect changes in the clock signal from the data set and will convert the changes into bit end and strobe pulses. For this type of operation, the constant entered into the constant (odd) side of the corresponding storage line of buffer 22, must be all zeros. The zero constant will provide an overflow signal from decrementer 210 when the constant is gated from the buffer 22 at time T1A as above described, i.e., by the T1AB signal through or 28. This overflow signal is too late to set the overflow latch 222 as the TOB signal is dropped blocking and 221.

The data set clock line 250 is down for the first half of a bit time and rises at the middle of the bit time. Since the output of the overflow latch 222 will normally be down, the exclusive or circuit 251 will not be satisfied until the middle of the bit period when data set clock line 250 comes up. At the next TOD time, and 252 will receive the overflow signal from decrementer 210, (the count from buffer 22 being zero for this operation) and the output of exclusive or 251 to send a signal through or 225 for the same function as set out above, the strobe signal being set by flip flop 226. This sets the bit 0 position in buffer 22 which blocks the exclusive or 251 so long as the data set clock 250 remains up. When clock line 250 goes down, the bit end signal is sent and the bit 0 position is reset to zero in the manner previously set out. Thus, the strobe and bit end signals from flip flops 229 and 226 are controlled by the rise and fall of the data set clock on line 250.

Figure 5:
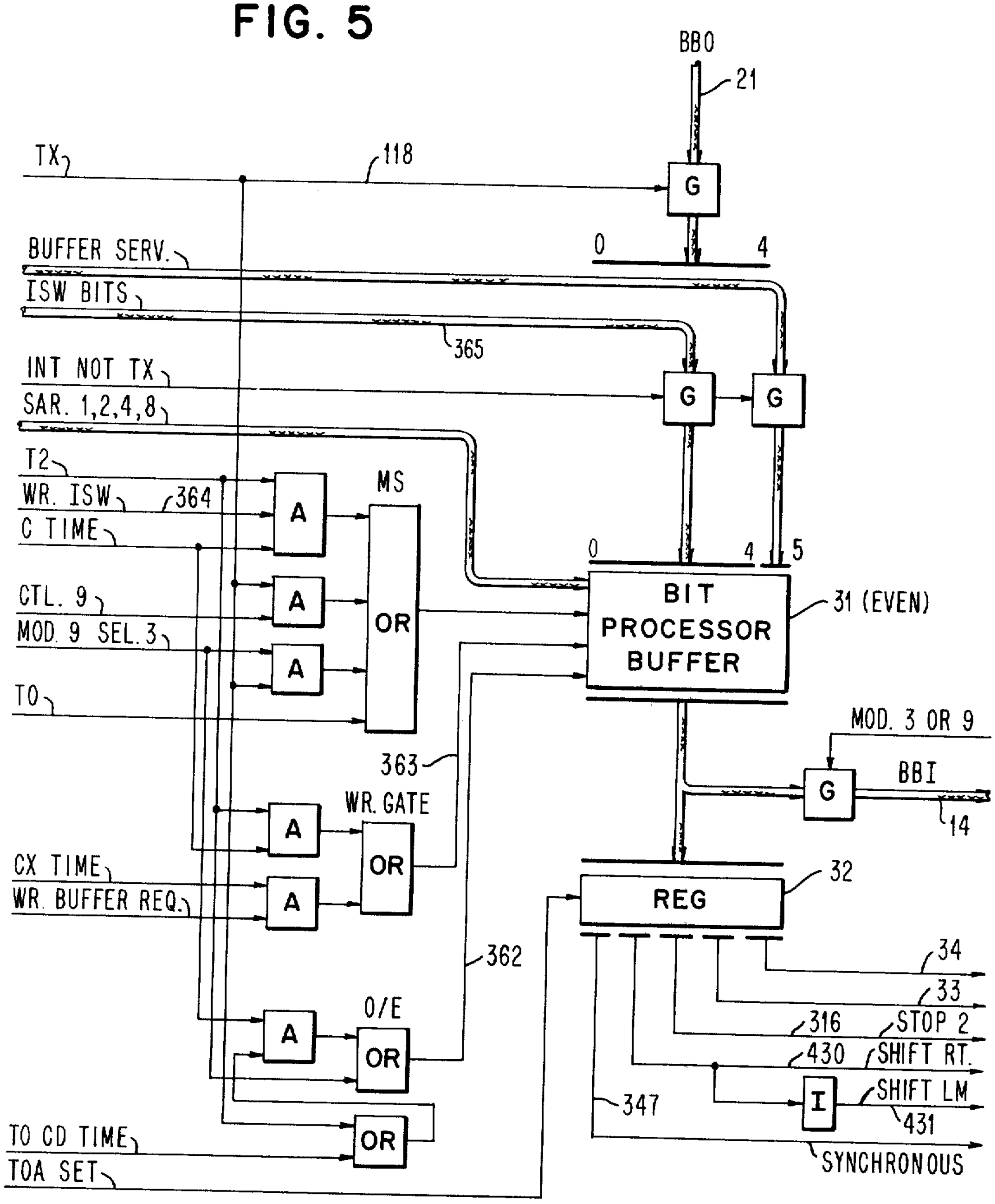
FIGS. 5, and 6 show the features of the bit processor of the system, FIGS. 7A and 7B combined as indicated by FIG. 7, set out the character processor part of the system.

Bit Processor 30 (FIGS. 5 and 6)

The bit processor 30 creates the sequence of control signals needed to transmit or receive a series of bits as a character. It also provides the storage to assemble the interrupt status word (ISW). The bit processor buffer 31 operates as two independent six-position buffers. FIG. 5 illustrates the ISW and line status section. FIG. 6 illustrates the bit counter section. In this description of the bit processor 30, only its operation for one device (SAR 1) will be discussed. The basic circuit operation will be the same for each device when it is addressed and the individual cycles of the bit processor 30 will be interspaced with those for other devices. The variations between operations for devices will depend on the contents of the device constants words that relate to the separate devices.

Asynchronous Transmit

The sequence of operations in the bit processor are similar for both asynchronous (start-stop) and synchronous data in either transmit or receive modes. The explanation for asynchronous transmit, with variations, applies to the other modes.

1. The write device constants command (modifier 9 on bus 19, FIG. 3) loads bit 0-4 of the constants word on BBO 21 into the line status (even) section of the buffer 31 when the scanner addresses the device during a cycle steal TX time.

2. Each time after this, when the device is addressed, the line status bits of buffer 31 are set into the register 32 at T0A time. Bit 0 will be off for asynchronous operations. Bit 1 is directed to the character processor. Bit 2 will cause two stop bits to be generated after each character if the bit is set on. Bits 3 and 4 will determine the number of bits per character of data.

3. At the beginning of a character, the length code (bits 3 and 4 of register 32) is loaded over lines 33 and 34 into the bit counter part (odd) of buffer 31 via a group of ands and ors 35, FIG. 6. The conditions needed to do this are the bit end signal from the bit rate processor 20, FIG. 4, on line 24, bit counter = 0 from register 32, and character in process, (CHIP IN) developed in and 36 and or 361 by buffer full and transmit signals. The signals are combined in ands 37 and 38 to control ands 35 so that the next time the device is addressed by the scanner, bit characters 0 and 1 will transfer to low order bit counter positions 2 and 1, and bit counter position 8 will always be set on.

4. Each time the scanner addresses the device storage in the bit counter buffer 31, the contents are set into the REG 32. The count goes through the incrementer 310 (an adder as set out on pages 61 to 65 or pages 171–172 of the "Manual of Logic Circuits" in which one of the adder inputs is normally zero but will be set to a one when an increment control line is raised) unchanged unless the incrementer 310 receives a bit end signal. The unaltered count is written back into the buffer 31.

5. When a bit end signal on line 24 signifies the end of the bit, the incrementer 310 increases the count by a unit.

6. Steps 4 and 5 above are repeated until the bit counter part (bits 2 to 5) of the devices part of buffer 31 is stepped to 15 (all bits on). This indicates that the last bit of the character is being transmitted.

7. The bit end signal on line 24 together with a value of 15 in the counter activates and 313 and or 314 of gates 35 to change the incremented value of zero to a value of one which is returned to the count buffer 31 so that the stop bit can be transmitted.

8. Unless there is a stop 2 bit set in the line status word part of buffer 31, see FIG. 5, the stop 2 signal on line 316, inverted in an inverter 317, is combined with a register equals one signal on line 318 in an and 319 to activate or 320 to put an ASN TERM signal on line 321. The signal on line 321 together with a bit end signal on line 24 will energize and 322 to bring up ASN RESET signal on 323. This signal, inverted in inverter 351, will block the CHIP bit, set at one from passing through and 330 and or 361 into the 0 bit position of buffer 31 which, on the next cycle with the CHIP bit set at zero, blocks and 355 to lower the signal on line 356 and prevents the output of the incrementer 310 from writing into the buffer 31 (counter goes to 0).

9. If there is a stop 2 bit set in the line status word in buffer 31, the counter reset will occur after the second stop bit is generated for and 319 will be blocked and or 320 will be activated by the next count (Reg. = 2) signal from buffer 31.

10. When the character processor buffer 41 is filled with the next character to be transmitted, the above procedure is repeated starting with Step 3.

Asynchronous Receive

The operation of bit processor 30 in the asynchronous receive mode is very similar to its operation in the above transmit mode. The most notable difference is in the establishment of the character in process (CHIP) signal on line 334.

1. It is to be noted that in asychronous receive mode, the interval between characters is defined by a mark signal level of indefinite length.

2. The receive space signal on line 335 which signal is derived from the receiver date line, FIG. 8, indicates the presence of the start bit. A receive signal space on line 335, a receive active signal on line 336, and a not synchronous (an inverted signal from synchronous line 347, FIG. 5) signal on line 337 will activate and 338 and or 361 to energize CHIP IN line 334 and cause the CHIP bit to be written into the bit 0 position of buffer 31.

3. The next time the buffer line is addressed by the SAR bus 11, the set CHIP bit will allow the bit rate processor 20 to operate as set out above. The bit rate processor 20 will develop a strobe signal and a bit end signal for the start pulse.

4. The bit end signal on line 24, CHIP IN on lines 334, Reg. = 0, and the inversion of the false start signal from inverter 37 activate ands 37 and 38 to transfer the length code bits in buffer 31 to the bit counter part of buffer 31 as in the transmit operation. The bit processor now operates in the same manner as it did in transmit. The bit count will be incremented by each bit end until asynchronous reset takes place.

5. The receive transfer signal is generated on line 341 when the count reaches 15.

6. The bit processor circuits will then stop operating and wait for reception of another start bit.

Synchronous Transmit and Receive

In synchronous mode, the bit processor immediately starts processing of the next character without transmitting or receiving start or stop bits.

1. The bit counter is reset to 0 by preventing a recirculation of the count by the bit end signal on line 24 that occurs when the bit counter value equal 14. This is accomplished by combining in and 348, in synchronous terminate signal on line 345 from an and 346 set by a synchronous signal on line 347 from register 32, FIG. 5, and by a Reg. = 14 signal with a bit end signal to produce a synchronous reset signal on line 349. The ASN RESET line 323 and the SYN RESET line 349 are inputs to an or circuit 350 whose output is inverted by an inverter 351 to produce the NOT A/S RESET signal on line 352. Line 352 is normally up to condition and 355 to allow a signal on line 356 when the CHIP signal from bit position O of buffer 31 (odd) and the Reg. = 0 signal are up, but drops the signal on line 356 when a reset is signalled. This blocks ands 35 for transfer of the incrementer 310 output to the bit counter part of buffer 31. It also blocks at 330, the transfer of the CHIP signal back into the buffer 31. CHIP will be written into the buffer 31 by buffer full and transmit signals through and 36 or by sync rec start on receive through and 360.

ISW Operation (FIG. 5)

When the addressed device requires an interrupt operation, the interrupt status word (ISW) for that device is stored in the ISW and line status section of the device's storage line of the bit processor buffer 31. It can then be read by the operating program of CPU 2.

1. .The ISW bits on the ISW line 365 are written into the even part of the device's line of buffer 31. This is accomplished by selecting the module for write ISW on line 364 while O/E line 362 is down and write gate line 363 is active.

2. The ISW is read onto BBI 14 by a read ISW command (modifier = 3) from ands 113, FIG. 3. This command selects the module O/E even while gating the data onto BBI 14.

Interrupt Pending

The bit counter section (odd) of buffer 31 stores the interrupt pending bit from a line 368, FIG. 6, in bit position 1 while an interrupt for the addressed device is pending.

Character Processor 40

Figures 7, 7A:
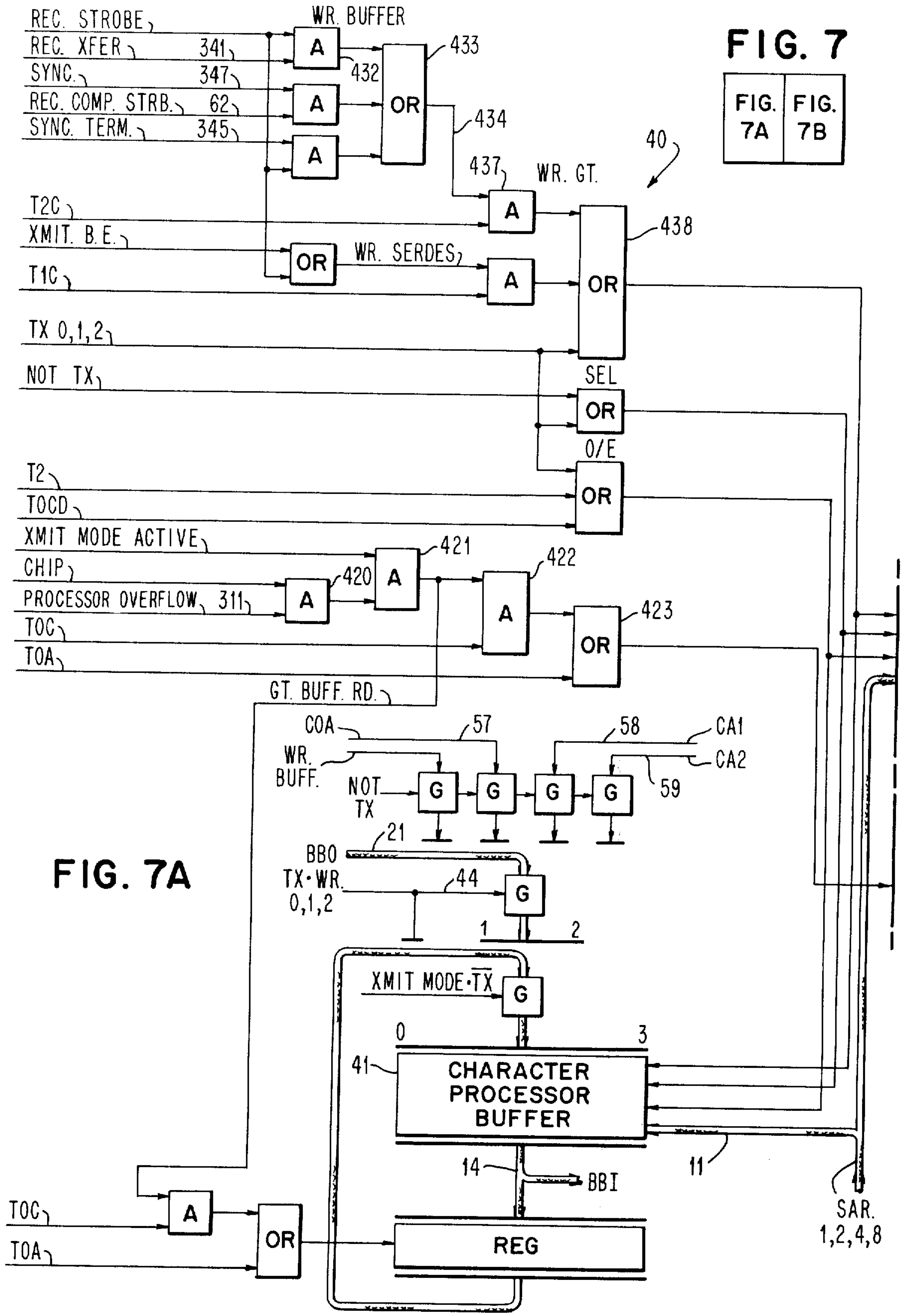

The character processor 40, FIG. 7, buffers the output characters and performs the bit serialize operation for transmit mode. It also stores control bits that will be used to terminate transmit mode and establish receive mode.

During receive mode, it performs the deserialize operation and buffers the bits of input characters. It also stores the output of the character alert element and vertical redundancy check (VRC) error data for transfer to the CPU 2.

Asynchronous Transmit

1. The write data command on bus 118, FIG. 3 transfers the bits of the character to be transmitted into the character processor buffer 4. Bits 8-14, FIG. 7B, of BBO 21 enter positions 8-14 of buffer 41. Buffer bit 15 is set to the parity condition established by the command modifier through parity generator 42. Bits 0-2 of the data word buffer 41, FIG. 7A are set on by the cycle steal write command on line 44 and bit 0 becomes the buffer full bit.

Figure 7B:
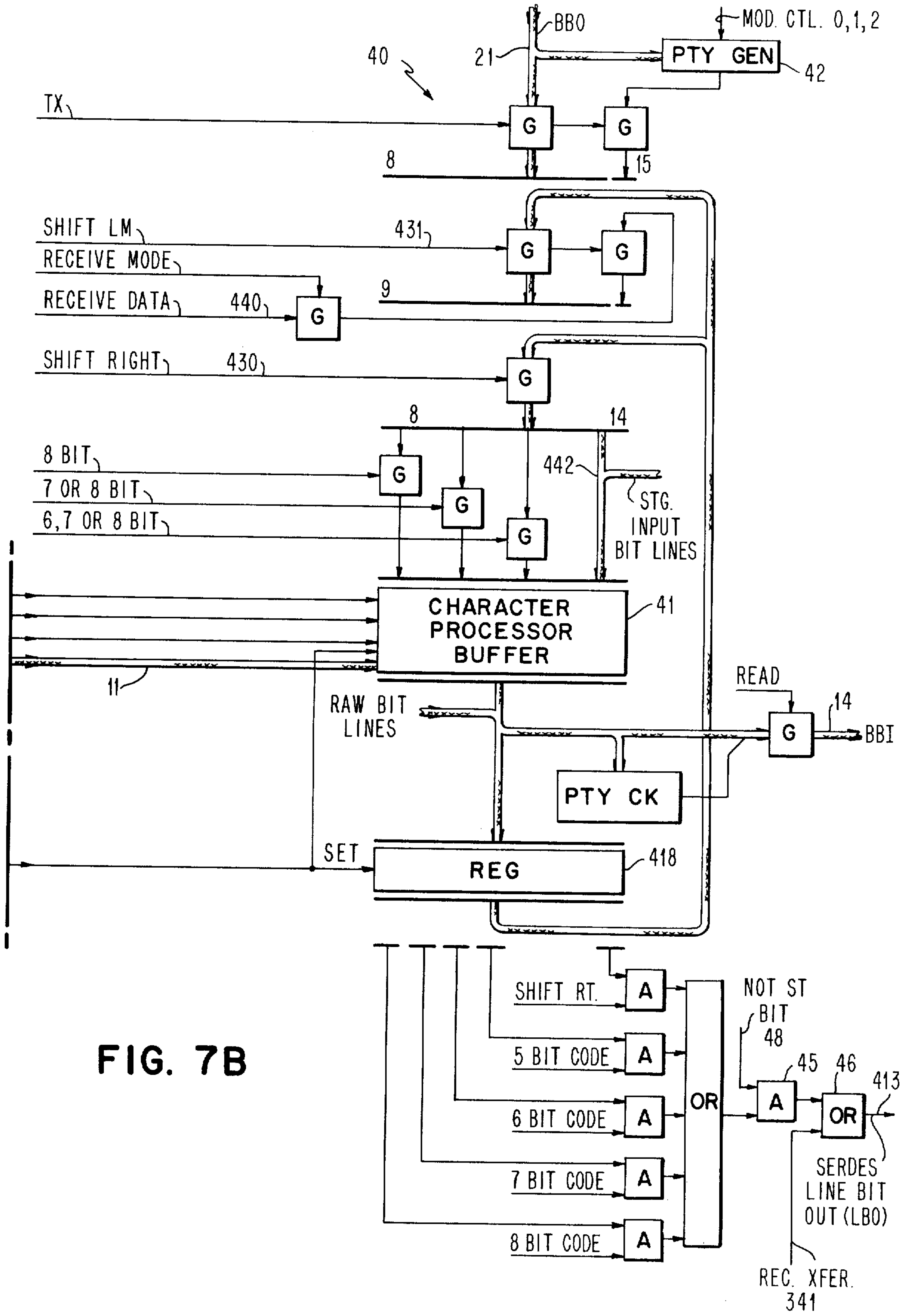

2. If a character is being transmitted, the character processor 40 will complete sending it including the stop bit or bits required. The stop bits will leave the line in a mark status. A buffer full signal from bit position 0 initiates sending a space level signal as a start bit. This is accomplished by blocking the output of serdes line bit out and 45 and or 46 with an inverted start bit on line 48 (FIG. 7B). The start bit also forces a data valid signal on a line 49, FIG. 8, which with a select line 1 signal decoded from the scanner outputs on a line 410 triggers, through and 411, the LBO flip-flop 412 (FIG. 8) When the LBO line 413 is up, it enables setting of flip-flop 412 from and 411 and when the line 413 is down, its signal inverted by inverter 414 will reset the flip-flop 412. There is a flip-flop 412 for every line and device that is attached to the MPX 1. The status of the flip-flop 412 can be changed only when (1) the status of LBO line 413 changes, (2) a data valid signal is present on line 49, and (3) the scanner selects the associated device by a signal on line 410. The circuits above the broken lines are the parts of the line interfaces 6, FIG. 1, which are specific to line circuit 1. A similar set of control circuits is present for each other line and are indicated by the select line 2 to select line n circuits. The purpose of these circuits is to gate the output and input signals of the data sets to the multiplexer unit when the multiplexer is processing data for that data set.

3. The buffer full signal on line 312, FIG. 6, and the transmit, line 380, gate 36 to develop CHIP IN on line 334 in the bit processor 30, and the bit processor 30 and the bit rate porcessor 20 start producing the signals necessary to transmit the data in buffer 41.

Figure 8:
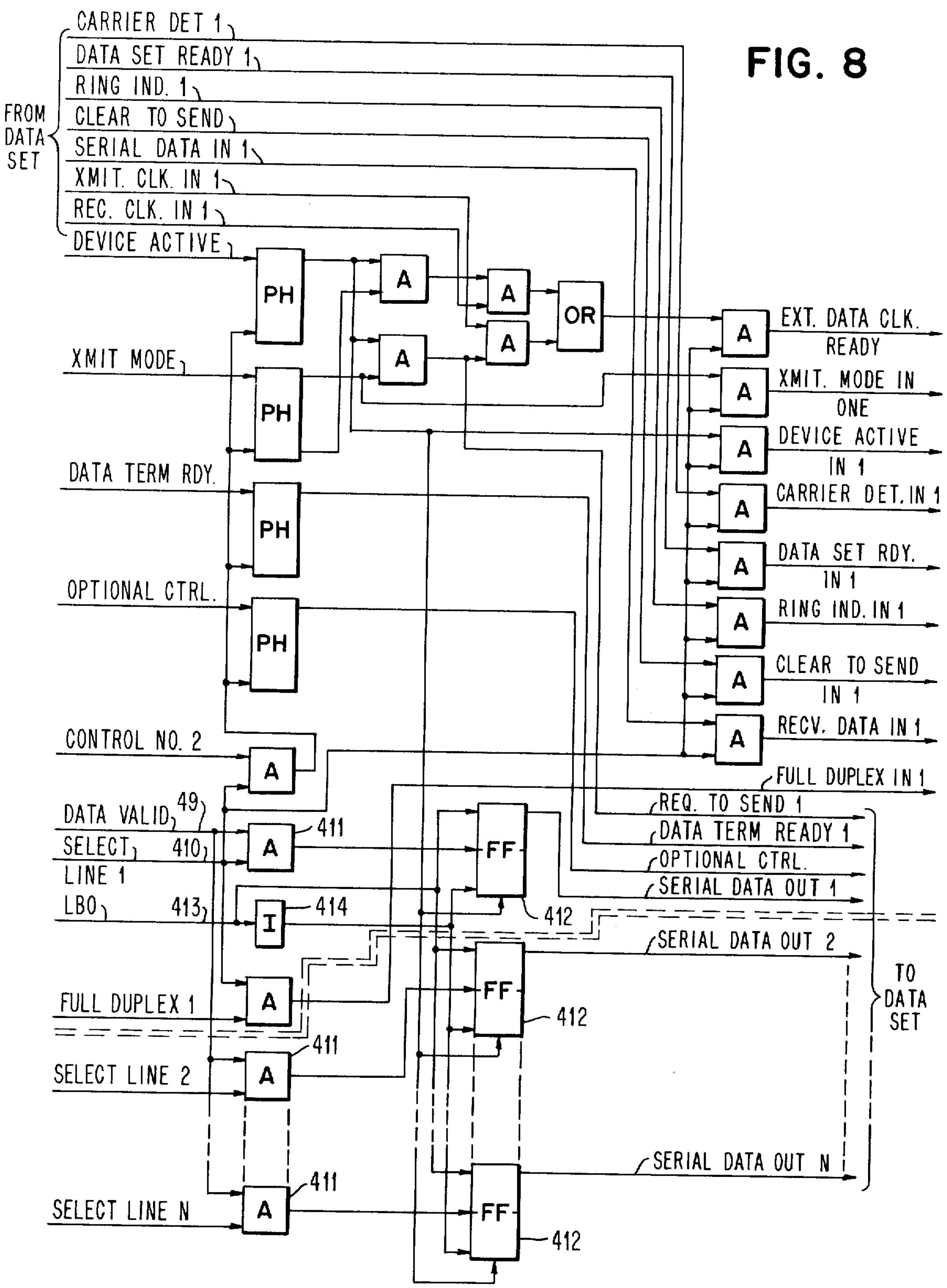
FIG. 8 shows the interface units to the data sets serving the individual lines, and FIG. 9 and chart 9A shows the character alert section to scan the incoming data as it is assembled to identify selected character groupings in the data.

4. The character processor serdes (even) bits are gated into the register 418 but are replaced with the new character in the buffer 41 (odd) because the bit count in the bit processor 30 equals 0. This is by the bit count = 0 signal and the CHIP signal from FIG. 6 gating and 420, and if the MPX 1 is in the transmit mode (here assumed) and 421 is gated to put out a signal GT BUF RD. This signal with the TOC time signal gates and 422 to pass a register set signal through or 423. This will occur each time the scanner selects the line until the end of start bit time. When a bit signal occurs on line 260, FIG. 4, data valid line 49 will be brought up allowing the high-order bit of the stored character to set the flip-flop 412 (FIG. 8). The bit end signal also allows the register 418 to be written back into the serdes buffer shifted one position. The buffer full signal resets when the buffer data is transferred into the serdes part of the buffer.

5. The serdes part of buffer 41 will be set into the register 41 each time the scanner gates the buffer 41. The next successive bit occupies serdes high-order position and is gated to the LBO circuits over line 413. When it is time to place that bit on the transmission line, the bit end signal causes data valid line 49 to trigger the flip-flop 412. Bit end also allows the register 41 data to be written into the serdes part of buffer 41 shifted one position.

6. When the entire character has been shifted out of the serdes part of buffer 41 for the line being serviced and onto the line, the rec xfer signal (bit count = 15) on line 341, from FIG. 6, forces through or 46, the serdes line bit out on line 413 into a mark status. This produces the stop bit or bits as required.

7. When the buffer full bit in the storage part of the lines buffer 41 was reset (step 4), a buffer service interrupt signal was generated on BBI 14 for storage in the ISW part of buffer 31. When the bit processor signals the end of a character by a signal on line 321, FIG. 6, the character processor 40 begins a search for a buffer full signal for the scanned line. Normally, the buffer 41 would have been reloaded by this time. If it has not been, the processor continues the search until the buffer 41 is reloaded with a new character.

Asynchronous Receive

1. At the beginning of the start bit as above described, the bit rate processor 20 begins counting scan cycles in order to develop strobe signals and bit end signals on line 233 and 260 respectively. The first strobe signal comes in the middle of the start bit, but the start bit is not placed in the serdes part of the buffer 41 because no shift right or shift left gate signal is developed on lines 430 and 431 respectively.

2. At the next strobe time signal on line 233 for the first data bit, the bit is gated into the serdes part (low-order bit position if the shift is to the left or high-order bit position if the shift is to the right). At the same time, the contents of register 418 (the last character) are shifted one position and written into serdes part of the buffer 41.

3. Each successive bit enters the serdes part of the lines buffer 41 along with the preceding data bits (all shifted one position) at the successive strobe times.

4. The last data bit and the preceding data bits (shifted) enter serdes as in step 3. Furthermore, the receive transfer signal on line 413 gates and 432 and or 433 to put a signal on line 434. The signal on line 434 at T2C time gates and 437 and or 438 to allow the completed character in the serdes part to be written into the character buffer part. Buffer bit 0 is set on to indicate that the buffer is full, and bits 1-3 are set with any character alert bits.

5. An asynchronous terminate signal on line 231, FIG. 6, and a bit end signal generate a buffer service interrupt signal from the ISW word to the CPU 2. The receive circuits wait for another start bit to come in on the receive line 440. The CPU 2 must transfer the character from the character buffer 41 with a read command putting the character on BBI 14 before the last data bit of the next character is received to fill the serdes part of the buffer 41.

Synchronous Transmit and Receive

Synchronous mode operations are generally similar to asynchronous. In transmit mode, one difference is that the character processor must find the buffer full signal on immediately upon entering a buffer search. If a buffer full signal is not found, a data overrun interrupt will be generated in the ISW buffer 31. In receive mode, a distinction is that the circuits do not wait for a start bit signal as one character follows another without delay and without start and stop bits.

Character Alert 50

There are two write character alert commands to load special character patterns into a character alert buffer for detection of line or data control characters in the received data. A Modifier D (hexadecimal) (binary 1101) signal from decoder 18, FIG. 3, loads patterns 1 and 2 into the even side of character alert buffer 51. A Modifier E (hexadecimal) signal (1110) loads patterns 3 and 4 into the odd side of the character alert buffer.

Each time the scanner selects a given line address, all four of the alert patterns are read out of the buffer 51 and are compared in compare units 52 and 53 to the receive data in serdes buffer 41. This is accomplished by reading out alert patterns 1 and 2 into bit positions 0 to 15 early in the step and patterns 3 and 4 into bit positions 0 to 15 later in the step. If the pattern of the received data over bus 442 does compare in a compare unit 52 or 53 to one of the alert patterns, latches 54, 55 and/or 56 are set to identify the alert character. The resultant code, see FIG. 9A, where X indicates a significant signal and 0 indicates a non-significant signal is made available to the character processor buffer 41 over CA lines 57, 58 and 59. The latches are reset by the TOA time line at the beginning of each scanner step (so that they can be used for the next line address), so any comparison signals that occur at other than write buffer time (in the character processor) are disregarded.

In synchronous receive, the character processor will automatically begin a sync search compare on every strobe. The program must place the sync character in character alert position 1. When the sync pattern is detected, the receive compare signal line 60 is used to develop sync rec start signal on line 62 (see Bit Processor, FIG. 7). Once the TPMPX is in sync, it does not check for sync again. The program must make any required logical checks for sync during the message by checking the alert codes in the read data words.

Timeout Processor 60

The timeout processor 60 of FIG. 1 is substantially similar in function to the bit rate processor 30, and will not be described in detail. Essentially, it is loaded with a constant for each transmission line and counts down by one-half second increments until the count reaches zero. At this time, it sends an interrupt signal to the ISW buffer 31 for interrupting the CPU 2. The timeout processor can count continuously to be effective as an elapsed time counter to limit activity time of a communication line or it can be reset each time there is data activity on the associated line, thereby detecting periods of inactivity longer than a pre-determined interval.

The above description is of a preferred embodiment of my invention, but it is clear that many variations and modifications can be made without dhanging the inventive concepts as set out in the appended claims.

What is claimed as novel, is:

1. A frequency dividing system for reducing a constant frequency scanner input signal by any desired integral divisor, said system comprising:
   - a storage device having a buffer section and a counter section;
   - a signal bus;
   - readout means for said storage device operative during each cycle of said scanner input signal to sequentially first read out to said signal bus the data stored in said counter section and then the data stored in said buffer section; a decrementer receiving the data signals on said signal bus and operating to reduce the data represented thereby a unit value;
   - a register settable by the output of said decrementer;
   - register control means operative after the first operation of said readout means to set said register to the decremented value from said counter section;
   - an overflow latch in said decrementer to generate a signal if a representation of a zero value is received from said signal bus,
   - connections from said overflow latch to pass said signal to said register control means to render said register control means also operative after operation of said readout means to set said signal bus in accordance with the data in said buffer section to reset said register to the decremented value from said buffer section;
   - a counter section control to thereafter set said counter section to the value set in said register;
   - an input bus settable to a state to represent a divisor value;
   - gates between said input bus and said buffer section; and
   - gating controls to set said buffer section to a desired divisor represented by the set state of said input bus.

2. A frequency divider as set out in claim 1, and including:

a plurality of addressable buffer and counter sections in said storage device;

a storage address control section to read out said addressable sections seriatim to said decrementer during one scanner cycle;

a second latch settable by a value representation stored in one bit position of the addressed word of said storage device; and a pair of output signal latches alternately settable by said overflow latch and by the setting of said second settable latch.

3. A frequency divider as set out in claim 2, and including a regeneration path to return said stored value to said one bit position of said storage device;

a gate deactivated by one of said output signal latches to block said recirculation path and prevent further recirculation of said stored value in said one bit position; and circuits activated by the other output signal latch when set to supply a signal for recirculation through said regeneration path.

4. A frequency reducing system settable to give an output signal after each group of a selectable integral number of input operations, said system comprising:

a buffer storage settable to store a predetermined count value;

a count storage section to retain a count value;

a decrementer to reduce an input value by a single unit;

a readout device for each said storage section;

a sequence control unit;

a set of control gates activated by said sequence control unit to first read out said stored count value and then said stored buffer value to the input of said decrementer for each occurrence of said input operation;

a regeneration path including a settable register to hold the decremented value read out from said count section for subsequent storage in said count storage section;

output circuits activated when the readout from said count storage section represents a zero value; and gates energized by said output circuits when activated to substitute the decremented value of said buffer storage readout value for the decremented count storage section value in said settable register whereby said output circuits provide a sequence of output signals at a selectable integral subharmonic of the frequency of said input operations.

* * * * *